April 5, 1927.
F. SCHUSTER
1,623,209
ELECTRIC MELTING POT
Filed Dec. 16, 1925
2 Sheets-Sheet 1
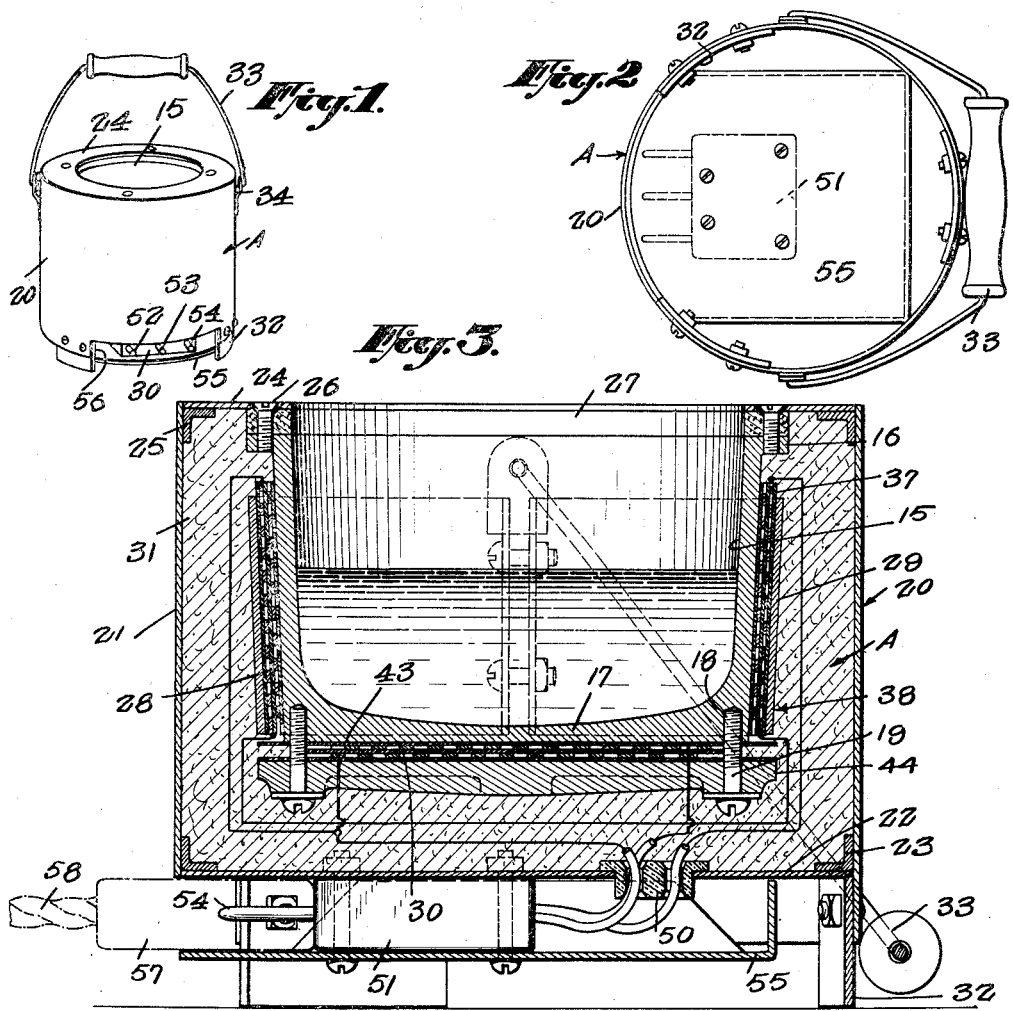
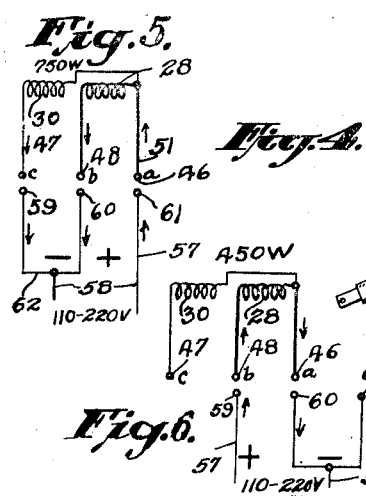
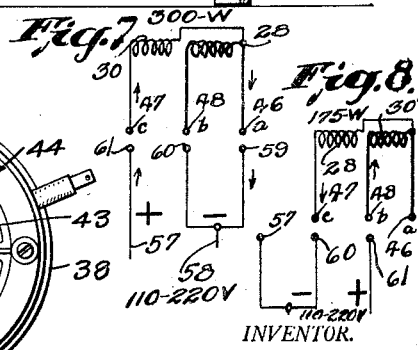
INVENTOR.
Frank Schuster
BY
Richard B. Owen
ATTORNEY.

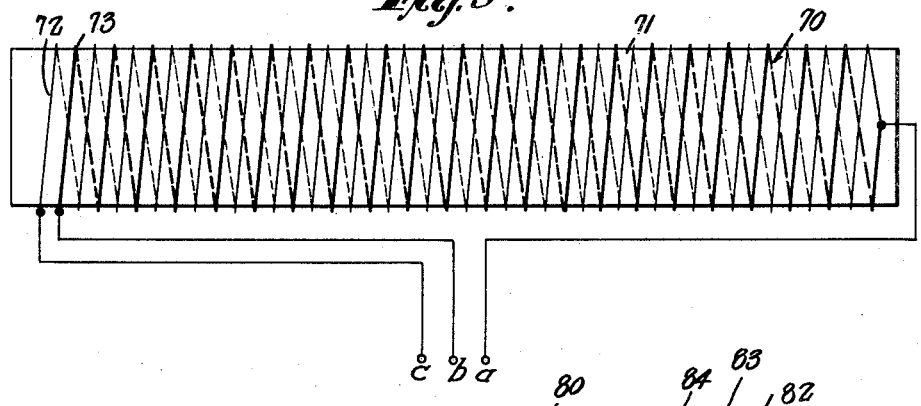
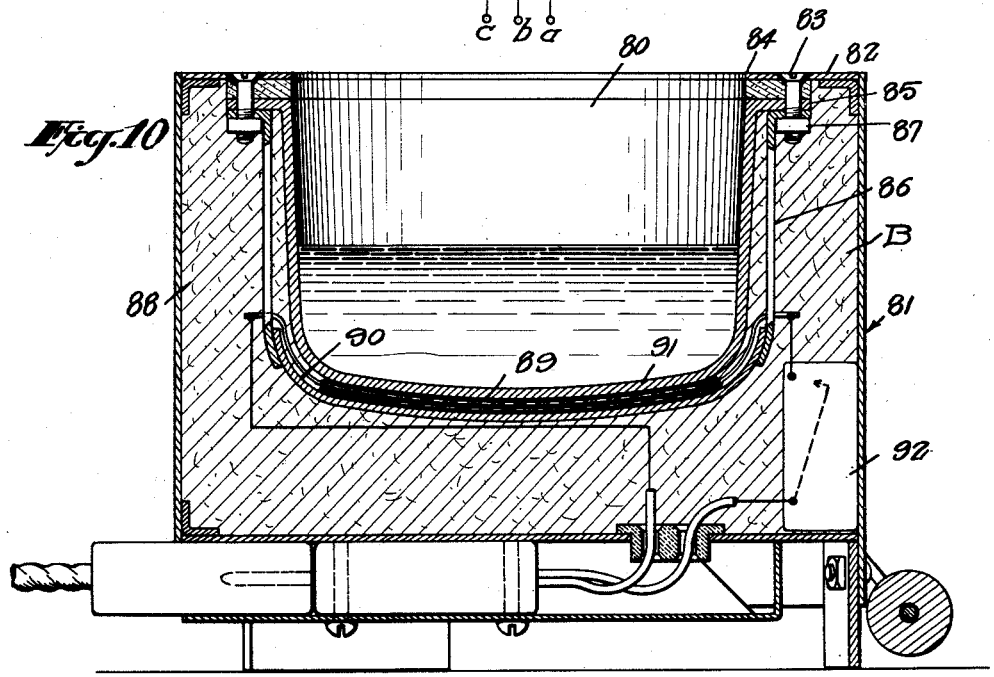

Patented Apr. 5, 1927.

1,623,209

UNITED STATES PATENT OFFICE.

FRANK SCHUSTER, OF RICHMOND HILL, NEW YORK.

ELECTRIC MELTING POT.

Application filed December 16, 1925. Serial No. 75,813.

This invention appertains to a novel apparatus for reducing solids, such as metals, to a liquid or flowing condition, and the primary object of the invention is to provide a melting pot, which is electrically heated and which is so constructed as to consume a minimum amount of electricity.

Another object of the invention is to provide novel means for heat insulating the pot and novel means for arranging the heating elements around the pot and in close proximity to the receptacle utilized for receiving the solids to be melted.

A further object of the invention is the provision of a novel melting pot including a receptacle for receiving the solids to be melted and a jacket completely surrounding and insulated from the receptacle with a suitable heat insulating material between the receptacle and the jacket.

A further object of the invention is the provision of novel means for connecting the novel heating elements with the pot.

A further object of the invention is the provision of novel means for controlling the flow of current to the heating elements so as to effectively control the amount of heat generated.

A still further object of the invention is the provision of an electric melting pot of the above character, which will be durable and efficient in use, one that will be simple and easy to manufacture and one which can be placed upon the market at a reasonable cost.

With these and other objects in view, the invention consists in the novel construction, arrangement and formation of parts, as will be hereinafter more specifically described, claimed and illustrated in the accompanying drawings, in which drawings:

Figure 1 is a perspective view of the complete melting pot,

Figure 2 is a bottom plan view of the same,

Figure 3 is a diametric section through the melting pot on a larger scale illustrating the novel construction thereof, Figure 4 is a bottom plan view of the heating elements, Figure 5 is a diagrammatic view illustrating the position of the controller for controlling the flow of current for producing a high heat, Figure 6 is a similar view showing the position of the controller for giving a medium high heat, Figure 7 is a similar view showing the position of the controller for giving a medium low heat, Figure 8 is a similar view showing the position of the controller for giving a low heat, Figure 9 is a diagrammatic view showing a modified form of heating element embodying a pair of heating coils, Figure 10 is a diametric central section through a modified form of electric melting pot using a single heating element.

Referring to the drawings in detail, wherein similar reference characters designate corresponding parts throughout the several views, the letter A generally indicates the electric melting pot which can be considered as the preferred form. As shown the melting pot A comprises an inner receptacle 15 for the solids to be melted and this can be formed of cast iron or the like similar to the conventional pot placed upon the market for melting lead and the like. The upper end of the receptacle 15 is provided with an annular outwardly projecting flange 16 while the bottom wall 17 of the receptacle or vessel is provided at spaced points preferably at quarters with threaded sockets 18 for the reception of machine screws 19 for a purpose, which will be hereinafter more fully described. The vessel or receptacle 15 is placed within a jacket 20 which can be formed of sheet metal or the like. The sheet metal jacket 20 is of such a size as to permit the vessel or receptacle 15 to be spaced at all points therefrom as can be seen from Figure 3 of the drawings. As shown the jacket 20 embodies the annular side wall 21 and the flat bottom wall 22 which can be connected with the side wall by suitable annular angle bars or the like 23. As stated the vessel 15 is placed directly within the jacket and is held spaced from the side bottom walls thereof by an annular top plate 24 which is connected with the side wall 21 by an upper annular band 25 which can also be formed from angle iron. The annular top plate 24 is connected with the vessel by the use of suitable machine screws and the like 26 which extend through the plate 24 and into the flange 16. It is preferred to space the top of the vessel 15 from the top plate by the use of a suitable ring or gasket 27 which, if preferred, can be formed from electric insulating material.

After the receptacle 16 is placed in position within the jacket and the various heating elements indicated by the reference characters 28, 29 and 30 have been placed in position with their associate parts, the vessel is heat insulated from the jacket by any suitable material, such as asbestos cement or the like 31. In order to support the pot A above a suitable support, depending legs 32 are connected with the lower end of the jacket, which can be extended below the lower wall 22 thereof as clearly shown in Figures 1 and 3 of the drawings.

In order to permit the easy carrying and handling of the pot A, the same is provided with a bail handle 33 which can be connected to ears 34 secured to the side wall 21 of the jacket 20 at diametrically opposed points. It is preferred to arrange two heating elements 28 and 29 at the sides of the vessel 15 and the heating elements 30 at the bottom thereof. Each of the heating elements 28 and 29 include a plate or form 35 formed of insulating material and the resistant wire 36 is coiled about the same. The forms 35 are arranged directly between a pair of electric insulating plates 37 and these heating units are then placed in engagement with the sides of the vessel and held in place therein by arcuate bands 38. As shown these arcuate bands 38 have their terminals provided with radially extending ears 39 which are connected by suitable nuts and bolts 40. It is obvious that with this construction that the heating elements 28 and 29 will be held in firm contact with the sides of the vessel.

The bottom heating element 30 is formed substantially in the same manner as the side heating elements and the same also include a form 41 formed of electric insulating material around which is wound the electric resistance wire 42. This form 41 is also placed between a pair of insulating plates 43 and a spider 44, which can be formed of cast iron, the same being thickest at its center to prevent warping is placed in engagement therewith and the feed screws 19 are passed through the rim of the spider and into the socket 18 and through the insulating plates 43 holding the lower heating elements in binding engagement with the bottom of the vessel 15. The coils or resistance wires 36 of the side heating elements 28 and 29 are connected together by a connecting wire 45 and one of the heating elements, namely the element 29 is connected with one of the line wires 46. The other line wire 47 is connected directly with one end of the heating units 30 and the opposite end is connected with the third feed wire 48. The outer terminal of the heating element 28 is connected by a connecting wire 49 with the wire 48 also. These wires 46, 47 and 48 are extended through a suitable porcelain guide 50 to the plug 51 arranged at the bottom of the pot and this plug 51 as shown is provided with three fingers or pins 52, 53 and 54 which are of course connected respectively with the wires 48, 47 and 46.

It is preferred to house the plug 51 within a suitable sheet metal protecting housing 55 which can be connected in any preferred way to the jacket 20 intermediate the legs 32. It is to be noted that the depending flange formed on the side walls 29 of the jacket is provided with a relatively wide notch 56 so as to insure the proper engagement of the socket 57 carrying the line wires 58. The socket 57 is shown diagrammatically in Figures 5 to 8 inclusive as well as the heating elements. It is to be noted that the socket 57 also embodies three electrical contacts 59, 60 and 61 and that the contacts 59 and 60 are connected by a bridge wire 62 thus the wires 58 is connected to two of the contacts namely 59 and 60.

By varying the position of the socket 57, the amount of heat generated can be instantly controlled. Attention is invited to the fact at this point, that in the diagrammatic view Figure 5 that the heating elements 28 and 29 which are arranged in series and are shown as one element are parallel to the lower heating element 30. When the socket and plug are arranged as shown in Figure 5 an extreme high degree of heat will be had, as the current will be permitted to flow to all of the heating elements. With the socket 57 arranged as shown in Figure 6 of the drawings so as to engage only the contact 59 and the contact 60 with the contacts 46 and 48 a medium high heat will be had and the current will flow only through the bottom heating element 30.

With the socket arranged as shown in Figure 7 a medium low heat will be had, the current flowing only through the side element 28 and with the socket 57 arranged as shown in Figure 8 for connecting the contacts 61 and 60 with the contacts 48 and 47 a very low heat will be had through the side and bottom elements which are connected in series by the socket.

Thus it is obvious from the foregoing that the socket 57 is shifted to the right and left and reversed so as to bring the various contacts carried thereby into engagement at different times with the various contacts carried by the plug.

This heat control system does away with the use of a rheostat or the like for controlling the flow and amount of the current.

In Figure 9, I have shown a heating element 70 which can be used to advantage in electric melting pots and this heating element 70 embodies a core or form 71 around which is wound a pair of resistance wires 72 and 73. These wires are connected to contacts B and A carried by a suitable socket which can be of the same type as plug 51. If desired, the form or core 71 can be made in two parts, one of which could carry the wire 72 while the other could carry the wire 73.

In Figure 10 of the drawing I have shown a slightly modified form of the electric melting pot which is generally indicated by the reference character B and the same embodies the inner vessel 80 which can be formed of sheet iron and a surrounding sheet metal jacket 81 which can be formed the same as the jacket 20 in the form A. The vessel 80 is connected to the annular top plate 82 of the jacket 81 by depending bolts 83 which extends through the plate and a suitable electric insulating washer 84 and through the flange 85 formed on the vessel 80. The bolts 83 also support depending straps 86 and suitable nuts 87 can be threaded on the bolt 83 for holding the vessel in the jacket and the straps 86 in place. The space between the vessel and jacket 81 is suitably packed with insulating material such as asbestos cement or the like 88. The straps 86 are employed for holding the electric heating element 89 in place at the bottom wall of the vessel 80 and these straps can be welded to a pressure plate or cap 90 which holds the said heating element 89 in place. This heating element 89 can be substantially the same as the heating element 30 and is insulated from the bottom wall of the vessel 80 and the pressure plate or cap 90 by a suitable insulating plate 91.

In order to control the current automatically when the heat reaches a predetermined degree a suitable thermostat of any preferred character indicated by the reference character 92 can be placed between the jacket 81 and the vessel 80 and incorporated within the feed wires as shown.

From the foregoing description, it can be seen that I have provided a novel electric melting pot which is of exceptionally simple and durable construction, which will effectively accomplish this purpose and which can be placed upon the market at an extremely low cost.

Changes in details may be made without departing from the spirit or scope of this invention, but:

What I claim as new is:

1. An electric melting pot comprising an inner vessel, an outer jacket surrounding and receiving the said vessel, an electric heating element disposed in the jacket in close proximity to the inner vessel, an annular top plate secured to the upper edge of the jacket, and a heat insulating ring disposed between the upper edge of the vessel and said top plate.

2. An electric melting pot comprising an inner vessel, an electric heating element arranged in close proximity to the vessel, insulating plates disposed on each side of the electric heating elements, adjustable strap members for clamping the heating element to the vessel, means connecting the vessel to the jacket, and insulating means disposed between the vessel and the jacket.

3. An electric melting pot comprising an inner vessel, a jacket spaced from and surrounding the vessel including a side wall and a bottom wall, an annular top plate connected with the side wall, an electric insulating ring disposed between the upper edge of the vessel and the top plate means connecting the top plate, washer and vessel together, a heating element arranged within the jacket, means clamping the heating element directly to the vessel, and heat insulating means arranged within the jacket between the vessel and said jacket.

4. An electric melting pot comprising an inner vessel, a jacket surrounding and receiving the vessel, means connecting the vessel with the jacket in spaced relation thereto, a pair of side heating elements engaging the side wall of the vessel. adjustable strap members for clamping the side heating elements to the vessel, a ribbed bottom heating element, means clamping the bottom heating elements to the vessel, heat insulating means disposed between the vessel and jacket and means arranged exteriorly of the jacket for controlling the flow of current to the heating elements.

5. In an electric melting pot, an inner vessel, a jacket receiving and surrounding the inner vessel, means connecting the inner vessel with the jacket, a pair of spaced side electric heating elements engaging the side wall of the vessel and arcuate clamping members surrounding the heating element in spaced relation with the vessel and means connecting the terminals of the clamping members together for holding the heating elements in contact with the vessel.

6. In an electric melting pot, an inner vessel, a jacket receiving the inner vessel, means securing the vessel to the jacket, an electric heating element arranged in the jacket including a form and resistant member around the form, semi-circular clamps for holding the heating elements in place, said clamps being substantially the width of said heating elements, a pair of spaced insulating plates on the opposite sides of the heating element, and means extending through the plate and into the bottom of the vessel for holding the heating element in contact with the bottom wall thereof.

7. In an electric melting pot, an inner vessel for receiving the material to be melted, an outer jacket, heat insulating means between the jacket and the vessel, a bottom heating element including a form, a resistance member wound about the form, insulating plates arranged on each side of the form, clamping plates engaging the lower insulating plate, and a plate ring having a greater thickness at its center than at its periphery connecting the clamping plates to the vessel for holding the heating elements in contact with the lower surface thereof.

8. In an electric melting pot, an inner vessel, an outer jacket, heat insulating means arranged between the vessel and jacket, a bottom heating element, a depression cap engaging the bottom heating element and depending straps connected with the pressure cap normally urging the same toward the inner vessel and the heating element in contact therewith.

9. In an electric melting pot, an inner vessel, an outer jacket, heat insulating means between the vessel and the jacket, a pair of side heating elements and a bottom heating element, means electrically connecting the side heating elements in series and in parallel with the bottom heating elements and a plug embodying contacts whereby the heating elements may be selectively operated in parallel or in series.

10. In an electric heating device, a heating element including a form and a pair of independent resistant wires coiled about the form, means electrically connecting the resistance wires together at one end and to a contact, and means electrically connecting the other terminals of the resistance wires to independent contacts.

In testimony whereof I affix my signature.

FRANK SCHUSTER. [L. S.]